United States Patent [19]

Brown et al.

[11] 4,093,955
[45] June 6, 1978

[54] WELL-LOGGING CAMERA USING MODULATED LASER LIGHT PATH FOR EXPOSING IN CAMERA PROCESSABLE ELECTROGRAPHIC FILM

[75] Inventors: Lee Roy Brown; Thomas M. Davison, both of Houston, Tex.

[73] Assignee: Sie, Inc., Fort Worth, Tex.

[21] Appl. No.: 730,743

[22] Filed: Oct. 8, 1976

[51] Int. Cl.² ............................................. G03G 13/06
[52] U.S. Cl. ......................................... 354/3; 346/108; 355/3 R; 355/5
[58] Field of Search .................. 346/108, 153, 160; 354/3, 63; 355/3, 5, 13, 16

[56] References Cited

U.S. PATENT DOCUMENTS

| 2,892,391 | 6/1959 | Mayo et al. | 354/3 X |
| 3,358,081 | 12/1967 | Young et al. | 346/108 X |
| 3,410,203 | 11/1968 | Fischbeck | 346/160 X |
| 3,680,955 | 8/1972 | Yata et al. | 354/3 X |
| 3,737,913 | 6/1973 | Kirkpatrick | 346/108 X |
| 3,864,035 | 2/1975 | Kuehnle | 354/3 X |
| 4,011,568 | 3/1977 | Oughton et al. | 354/3 |

*Primary Examiner*—William M. Shoop
*Attorney, Agent, or Firm*—M. Ted Raptes

[57] ABSTRACT

A well-logging camera for producing API format with traces utilizing a unique modulated laser light path to expose an in camera processable, electrophotographic film. After exposure, the film passes through an easily removeable, developing means having means stripping the film of excess developer. The film is driven through the camera by edge drive mechanism in which rotative force from the drive rollers is effectively transferred to skewed pressure rollers for effective drive.

12 Claims, 7 Drawing Figures

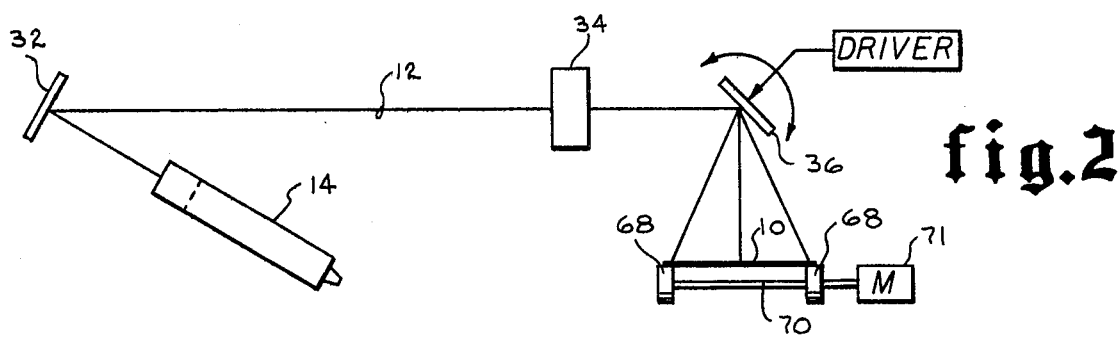
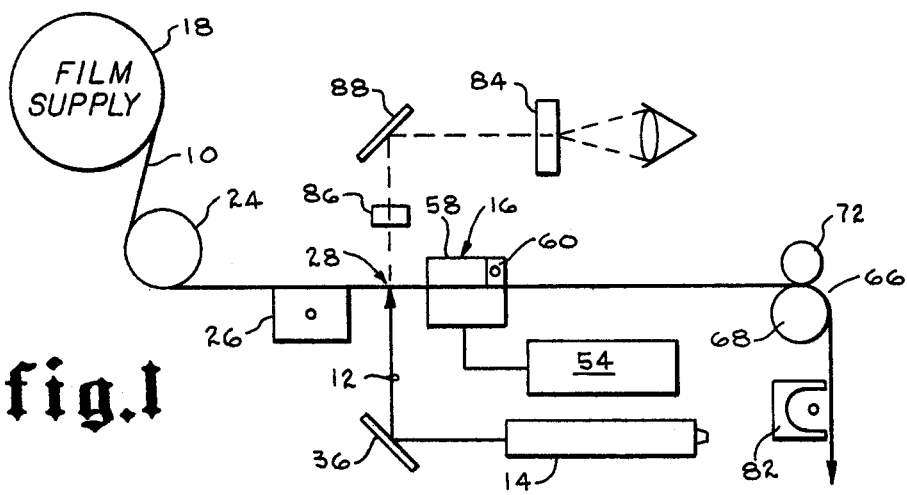
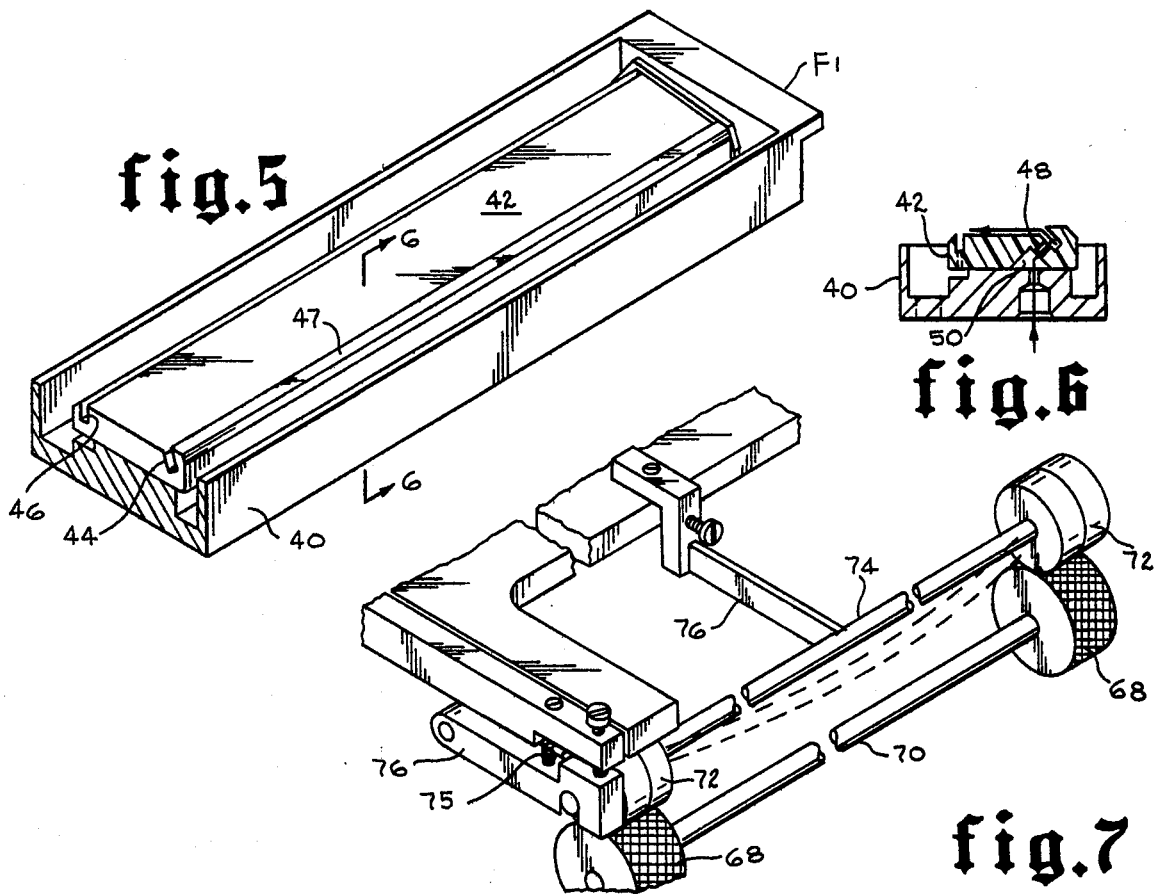
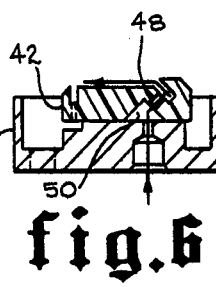

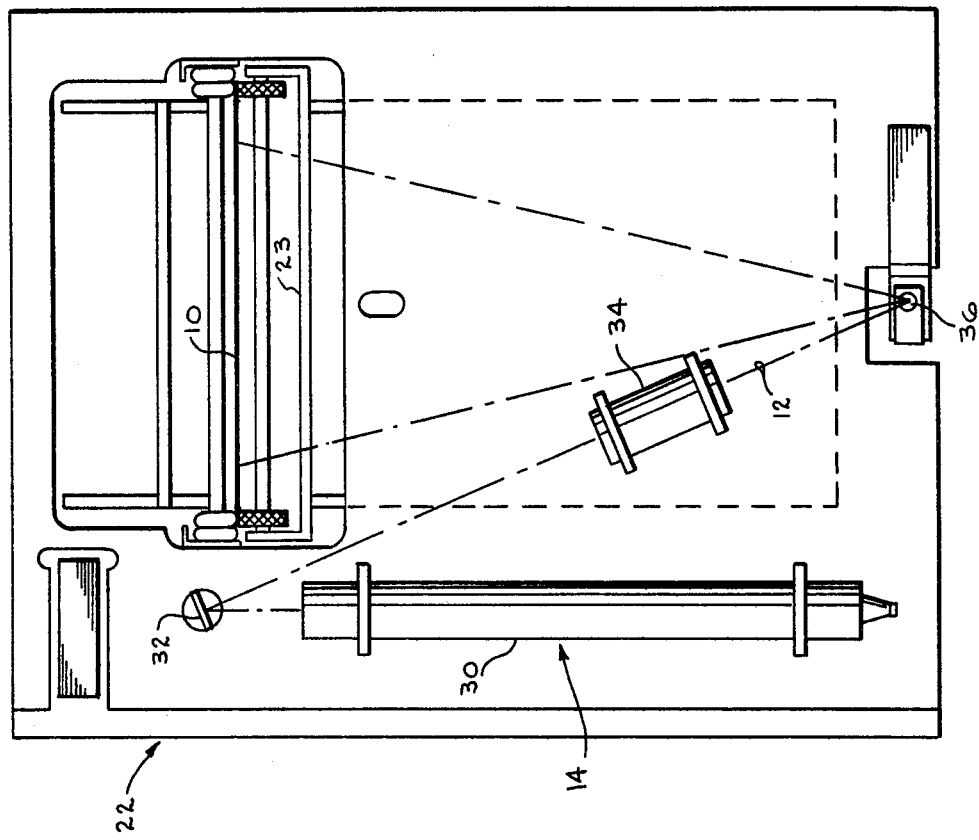
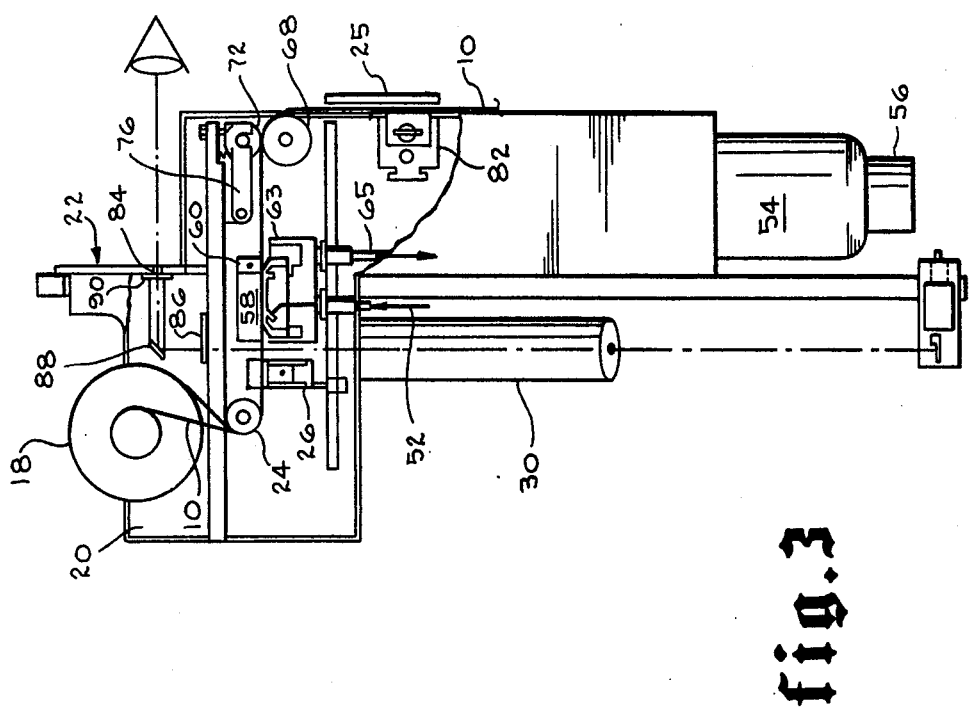

4,093,955

WELL-LOGGING CAMERA USING MODULATED LASER LIGHT PATH FOR EXPOSING IN CAMERA PROCESSABLE ELECTROGRAPHIC FILM

BACKGROUND OF THE INVENTION

This invention relates to a well-logging camera producing well logging format with traces on electrophotographic film from a laser-scan modulated light path.

Traditionally multiple trace oscillographs (or cameras as termed by the petroleum industry) have consisted of individual D'Arsonval galvanometers which represent each analog input to be presented. These cameras which produce reproducible masters use wet-process film which requires darkroom loading of the film storage magazine and darkroom processing. Recently digital computers capable of handling vast quantities of data at extremely rapid rates have become available for well-logging services making the job of the analog camera more complex.

High speed recorders utilizing modulated laser light to scan photographic film, such as disclosed in U.S. Pat. No. 3,389,403, are known in the art. However, since these recorders use wet-process film, the film handling problem is still present. Although there are laser scan recorders utilizing thermally processed films, the processing speed range and stability present problems in real time display.

Accordingly, it is an object of the present invention to provide a unique, simplified, well-logging camera producing well-logging format with traces on in-camera, processable, electrophotographic film from a computer controlled laser-scan modulated light path.

It is another object to provide an improved developing means for an electrophotographic film camera.

It is a further object to provide an improved film drive mechanism for an electrophotographic film camera.

SUMMARY OF THE INVENTION

The novel well-logging camera of the present invention utilizes the modulated light path of a laser to expose electrophotographic which is fully developed inside the camera thereby providing an immediate recording of well data without the necessity of further wet processing. The light path from the laser to film lies in a single plane and utilizes a minimum of optics. The camera contains an improved, easily removeable, developing means which present the toner to the emulsion side of the film. The toner attracts to the exposed area to provide the image. The developing means is so constructed that the emulsion side of the film does not touch the surface of the developing means after toner contact while at the same time holding the film taut and stripping the film of excess toner upon exit. Edge drive mechanism is provided which is formed of two pairs of cylindrical rollers spaced for engagement with the edges of the film. One set of rollers are drive rollers each having a finely etched metal surface. The other rollers are a pressure rollers, each having a resilient surface. The rollers are in such relation that although the film is interposed approximately one-half the length of the rollers, the relative force from each drive roller is transferred to each pressure roller whereby both rollers join in transporting the film. To maintain the film straight, the pressure rollers are skewed. To permanetize the image, a fusing means is positioned in the path of the film following the drive mechanism. To permit real time viewing of the film by the logging engineer, a viewing port is provided.

BRIEF DESCRIPTION OF THE DRAWINGS

FIG. 1 is a schematic view illustrating the film path through the camera;

FIG. 2 is a schematic view illustrating the optical path;

FIG. 3 is a side view of the camera of the preferred embodiment;

FIG. 4 is a back view of the camera shown in FIG. 3 illustrating the optical path of the laser;

FIG. 5 is a perspective view of the developing head;

FIG. 6 is a cross-sectional view taken on lines 6—6 of FIG. 5;

FIG. 7 is a perspective view of the pressure rollers illustrating the showing thereof.

DESCRIPTION OF A PREFERRED EMBODIMENT

As can be seen in FIGS. 1 and 2 the well-logging camera utilizes an electrophotographic film 10 which after exposure by a modulated light path 12 from a computer controlled laser 14 is fully developed by developing means 16 and permanentized by fusing means thereby eliminating further processing.

One suitable type of electrophotographic film is Transparent Electrophotographic Process (TEP) film on a clear polyester base, particularly Type P5-003, manufactured by Scott Graphics, Inc. of Holyoke, Mass. This film has a light blue colored imaging matrix suitable for original recording, with exposure requirements typical of a slow camera-speed film. The film will produce high resolution, continuous tone images of medium to high contrast in either a positive or negative imaging mode. Images on processed film are durable, heat and light stable, and are neutral black appearing. The film is comprised of a transparent conductive layer on the polyester base which provides electronic conductivity and a photoconductive coating which consists of a polymeric matrix, containing a derivative of phenylene diamine as the organic photoconductor, in combination with a dye sensitization system. Other specifics of the film may be obtained from Scott Graphics Publication, TEP Film Type P-5-003/9-75.

Referring now to FIG. 3, the electrophotographic film is contained on a roll 18 which is mounted in a frame 20 of the housing of the camera. The housing may be of cabinet construction having a hinged front panel 22 containing a drawer 23 in which the frame 20 is located. The drawer may be pulled out and the roll 18 loaded into the camera in ambient light. The film passes under a roller 24 and then a pressure plate 25 which is positioned above a d.c. corona charging device 26 mounted on framework on the backside of panel 22. The corona charges the emulsion side of the film to a controlled level making the relatively light-insensitive film quite light sensitive. Since the film is bipolar, a positive as well as a negative voltage can be applied. The maximum voltage should not generally exceed 1,000 volts Apparent Surface Voltage (ASV). After the film is charged, it passes an opening 28 in the frame through which the modulated light path exposes the film.

As can be seen in FIGS. 2 and 4, the light path from the laser to the opening lies in a single plane. A suitable laser is the modulated Helium-neon Laser model CR- 135 available from Coherent Radiation of Palo Alto, California. The laser is low powered (2 milli-watts) producing a wavelength of 632.8 nm (red) with acousto-optic modulation of the beam at rates up to 3MHz.

The laser head 30 is mounted on the backside of panel 22 (FIG. 4) with the beam directed to a mirror 32 also mounted on the panel. The beam is transferred by the mirror to a double achromatic lens system 34 which directs the beam to an oscillating mirror galvanometer 36 which may be a Series G-100 Optical Scanner produced by General Scanning Inc. of Watertown, Mo. mounted on the backside of panel 22. The oscillating mirror galvanometer sweeps the beam as a focused 0.005 inch spot across the film through an opening 28. The reflected beam from the galvanometer discharges various points across the film to produce API format and traces. The beam is controlled by a micro processor (not shown) which receives analog signals from the logging tools and through appropriate hardware and software organizes such information for delivery to the camera. An example of hardware and software which may be used is set forth in "Oscillograph Aids Digital Well-Logging Operations," *Oil & Gas Journal*, Vol. 73, No. 41, pages 57–60.

As can be seen in FIGS. 1 and 3, the film after exposure by the modulated laser light beam through opening 28 enters developing means 16. The developing means contains toner which will attract to the light exposed areas. The developer is formed of a tank 40 made of a plastic material such as material identified by the DuPont trademark Delrin, which is a hard, stable, low friction material. The tank 40 is mounted in framework on the backside of panel 22 wherein it is easily removeable for cleaning. Positioned in the tank is a developer head 42 also made of Delrin. Basically the developer head is a rectangular block having two longitudinal grooves 44-46 along the top surface, see FIGS. 5 and 6. Grove 44 is angular extending away from groove 46. Both longitudinal edges of the developing head are chamfered, the chamfer at the exit side being a sharper angle than that of the entrance side. The two ends of the developing head are tapered with the exit side wider than the entrance side. The portion of top surface of the developing head between the entrance side and angular groove 44 forms a ridge 47 which is slightly higher than the remainder of the top surface. Extending into groove 44 are a plurality of passages 48 which commence in a slot 50 extending along the bottom surface. Connected to the tank by an input hose 52 is a reservoir 54 having a pump 56. The developing fluid or toner which may be an electrodeveloper in freon carrier passes from the reservoir to the developing head where it flows through passages 48 out of angular groove 44 unto the top surface of the developing head in an even flow. A pressure plate 58 having an electrode 60 is mounted in the framework of the drawer 23 and positioned over the developing head, see FIG. 3. When in position, the pressure plate 58 applies pressure to the film and seals the entrance 62 to the developing means, the sides 63 and provides in conjunction with the developing head an exit slot 64. After the film passes the ridge 47 between entrance 62 and angular groove 44, it is subjected to the developing fluid which as a consequence of the construction of the passages 48 relative to angular groove 44 results in smooth even distribution of fluid on the top surface of the developer head whereby there is complete contact with the exposed side of the film. Unused developer fluid will flow from the developer head into the tank and then through a pair of hoses 65—65 back to the reservoir. It has been found that having the chamfered throat exit 64 results in any excess developing fluid being stripped from the film. The tapered ends of the developer head stretches the film taut eliminating waving action of the film. The electrode 60 holds the film against the pressure plate and aids in maintaining the exposed image from touching any surface of the developing head after it has been in contact with the developing fluid.

To transport the film through the camera, there is an edge drive mechanism 66 which effects efficient travel. The drive mechanism is formed of a pair of cylindrical drive rollers 68—68 mounted on a common shaft 70 and a pair of cylindrical pressure rollers 72—72 mounted on a common shaft 74. The rollers are spaced so that the edges of the film are interposed about one-half the length of the rollers. The drive rollers are made of metal having a finely etched surface. The shaft 70 of the drive rollers 68—68 is connected to a step motor 75 which moves the drive rollers in increments of 0.005 inch the size of the focused beam on the film. The pressure rollers are provided with a resilient surface of neoprene or urethane having a durometer hardness of 60–80. The pressure rollers are mounted so that they exert approximately 18 pounds of pressure on the drive rollers. One such means is to mount each end of shaft 14 of the pressure rollers in pivoted member 76 having its pivot on the frame of the drawer. The frame is provided with a counter bore receiving a screw which contacts a spring 78 which exerts force on the pivot arm 76 and consequently the pressure rollers. As a consequence even though the edge of the film extends half way along the length of the rollers, the rotative force of the drive rollers is transferred to the pressure rollers so that the film is effectively driven by both rollers. The shaft 74 of the pressure rollers is provided with means such as a screw jack 80 which bows the shaft slightly causing the rollers to be canted, see FIG. 7. The bias of the drive rollers will tend to pull the film toward each roller and maintain the movement of the film in a straight line.

To permanentize the image the film passes a fusing means 82 which may be a heat lamp. After passing the fusing means the image is permanentized and the film may be handled.

To permit the logging engineer to monitor the recording in real time as it progresses, the camera is provided with a viewing port 84 which, through a fresnel lens 86, periscope mirror 88, and frosted screen 89, allows examination of the recording as it is being made.

As can be seen, the well-logging camera of the present invention eliminates many of the problems prevalent in prior art recorders. It eliminates dark room loading and processing of the film and permits real time viewing of the recording and rapid viewing of the overall log. The developing means is mounted so as to be easily removeable. It is so designed that the film is held taut while passing through and the exposed surface maintained from rubbing contact after initial contact with the toner. The film is driven through the camera by improved edge drive mechanism which maintains stright line drive without contact of the image. The drive and laser will accept and be controlled by signals from a computer which receives its signals from the well-logging tools.

We claim:

1. A camera for producing well logging format with traces on a continuous strip of film in an online capacity from a computer controlled system, comprising:
   a housing;
   a roll of electrophotographic film mounted in the housing;
   corona means for charging the film to a controlled level;
   a helium neon laser providing a continuous beam of coherent light in the red spectrum;
   an acousto-optical modulator producing a modulated light path;
   a galvanometer driven oscillating mirror delivering the modulated light to the charged film in the form of a digital image;
   developing means presenting the toner to the exposed areas of the film;
   edge driving means precisely moving the film through the modulated light path and through the developing means; and
   fusing means permanetizing the developed image.

2. The camera specified in claim 1 wherein the edge driving means includes two spaced pairs of cylindrical rollers which engage the edges of the film, one of the rollers of each pair being a drive roller and the other a pressure roller, the rollers being so positioned that each edge of the film overlies approximately one-half the length of the rollers, the rollers being in such relation that the pressure roller exerts a force on the drive roller sufficient to transfer rotative motion to the pressure roller so that both rollers effectively drive the film.

3. The camera specified in claim 2 wherein the pressure roller is provided with a resilient surface and the drive roller is provided with a finely etched surface whereby rotative motion of the drive roller may be transferred to the pressure roller although the edge of the film is interposed approximately one-half the length of the rollers.

4. The camera specified in claim 3 wherein the axes of the pressure rollers are skewed relative to the path of the film thereby pulling the film tight and driving it straight.

5. The camera specified in claim 4 wherein the spaced pressure rollers are mounted on a single shaft and means are provided to bow the shaft thereby skewing the rollers.

6. The camera specified in claim 5 wherein the bowing means is formed of a screw-jack.

7. The camera specified in claim 1 wherein the developing means comprises easily removable tank in which there is positioned a plastic, generally rectangular developing head and a pressure plate which seals the developing head except for an exit slot, the developer head and pressure plate cooperating to provide even distribution of toner, non contact of the emulsion side of film after contact with toner and stripping of excess toner upon exit.

8. The camera specified in claim 7 wherein the means for stripping excess toner is a chamfered exit throat.

9. The camera specified in claim 7 wherein the means for providing even distribution of toner is formed by having an angular longitudinal groove in the top surface adjacent the entrance slot and the surface downstream of the groove being lower than the entrance, the groove having a plurality of toner passages in the wall.

10. The camera specified in claim 7 wherein the ends of the developer head are tapered thereby stretching the film taut preventing waving action.

11. The camera specified in claim 7 wherein the pressure plate contains an electrode which assists in holding the film off the surface of the developer head at the exit slot.

12. The camera specified in claim 1, wherein the digital image passes through a fresnel lens unto a frosted screen providing a viewing port to permit real time viewing of the recording.

* * * * *